United States Patent [19]

Seegmiller et al.

[11] 4,072,334
[45] Feb. 7, 1978

[54] ENERGY ABSORBING BUMPER

[75] Inventors: Wan Seegmiller; Bruce O. Young, both of Sacramento; Joe A. Story, Davis, all of Calif.

[73] Assignee: Energy Absorption Systems, Inc., Chicago, Ill.

[21] Appl. No.: 732,944

[22] Filed: Oct. 15, 1976

Related U.S. Application Data

[63] Continuation of Ser. No. 597,586, July 21, 1975, abandoned.

[51] Int. Cl.² .............................................. B60R 19/08
[52] U.S. Cl. .................................. 293/71 R; 114/219; 267/140
[58] Field of Search ................... 293/71 P, 71 R, 70, 293/72; 61/48; 114/219; 267/140

[56] References Cited

U.S. PATENT DOCUMENTS

| 3,335,689 | 8/1967 | Hein | 293/71 R |
| 3,411,304 | 11/1968 | Miller | 114/219 |
| 3,493,257 | 2/1970 | Fitzgerald | 293/71 R |
| 3,494,607 | 2/1970 | Rusch | 114/219 |
| 3,768,850 | 10/1973 | Barton et al. | 293/71 P |
| 3,778,093 | 12/1973 | Renner | 293/71 R |
| 3,782,768 | 1/1974 | Moore | 293/71 R |
| 3,869,167 | 3/1975 | Muller | 293/71 R |
| 3,902,748 | 9/1975 | Bank et al. | 293/71 P |

FOREIGN PATENT DOCUMENTS 1,113,032  5/1968  United Kingdom ................ 114/219

Primary Examiner—Trygve M. Blix
Assistant Examiner—Stuart M. Goldstein
Attorney, Agent, or Firm—Hume, Clement, Brinks, Willian & Olds, Ltd.

[57] ABSTRACT

An energy absorbing bumper for protecting an object from a collision is disclosed which has a compressible cellular core having a plurality of relatively large spaced apart cavities extending from the back side at least partially through the cellular core and a resilient outer skin enclosing the compressible core.

11 Claims, 6 Drawing Figures

ENERGY ABSORBING BUMPER

This is a continuation of application Ser. No. 597,586, filed July 21, 1975 and now abandoned.

BACKGROUND OF THE INVENTION

This invention relates to energy absorbing bumpers and energy absorbing bumper modules which are primarily intended to be located on vehicles to protect them from the effects of the impact forces imparted during collision with other objects.

Many efforts have been made to reduce the damage done as a result of the collision of a vehicle with another vehicle or with a fixed object. One type of device which has attained technical and commercial success is of the type described in U.S. Pat. No. 3,284,112 issued to J. W. Rich. That device is based upon the absorption of the collision forces by a liquid.

Other collision bumpers have been developed using cellular materials or resilient rubber like substances. One of the problems with these collision bumpers is that they tend to react very much like a linear spring and store the energy imparted during a collision rather than absorbing or dissipating it. This stored energy is then almost immediately returned to the impacting body in the form of a severe rebound which has a number of unacceptable side effects. In particular, the rebounding effect can result in whiplash and the possibility of resultant neck, back and spinal injuries to the passengers in the vehicles.

SUMMARY OF THE INVENTION

This invention relates to an improved energy absorbing guard or bumper and to energy absorbing modules for protecting objects from collisions. The energy absorbing bumpers and bumper modules of this invention have a compressible cellular core which has a plurality of relatively large, relatively deep spaced apart cavities or depressions located along the back side of the bumpers. These cavities extend at least partially through the core toward the front side of the bumpers. The bumpers and modules of this invention also have a resilient outer skin which encloses the core. This structural arrangement results in an advantageous column-cavity-resilient skin configuration in which a series of compressible cellular columns encased by a resilient skin are separated by spaced apart cavities.

In a preferred aspect of this invention, the cavities do not extend entirely through the core and the core includes a front wall of substantial thickness backing up the front outer skin surface which is the normal point of initial impact by the colliding body. In another preferred aspect of this invention, the backing plate to which the bumpers and modules are secured covers the open end of the cavities. This tends to resist the escape of air from the cavities during the compressive stroke of a collision and to create a partial vacuum in the cavities to help moderate the rebound of the bumper. Preferably, the attachment of the bumper to the backing plate creates at least a partial seal between the bumper's outer skin and the backing plate to further promote the above tendencies.

One of the primary advantages of the bumper and bumper modules of this invention is that a number of different energy absorption systems are provided in a single improved energy absorption device. Another advantage of this invention is that, during the initial stages of impact, the compressive forces are resisted by much less than the total available energy absorption capabilities of the bumper, and that, only in the later stages of the impact when it is most needed, are the compressive forces resisted by the maximum energy absorption capabilities of the bumper. A further advantage of this invention is the diminution of the linear spring effect usually found in collision bumpers containing a cellular core.

Additional features and advantages of this invention are described in, and will appear from, the description of the preferred embodiments which follow and from the drawings to which reference is now made.

DESCRIPTION OF PREFERRED EMBODIMENTS

The energy absorbing guard or bumper of this invention is advantageously intended to be employed on the front or back end, or on both ends, of a motor vehicle such as an automobile, a truck, a bus, or the like. The guard may also be used on fixed installations, such as loading docks and garage walls, which are subject to impact by vehicles.

Figure 1:
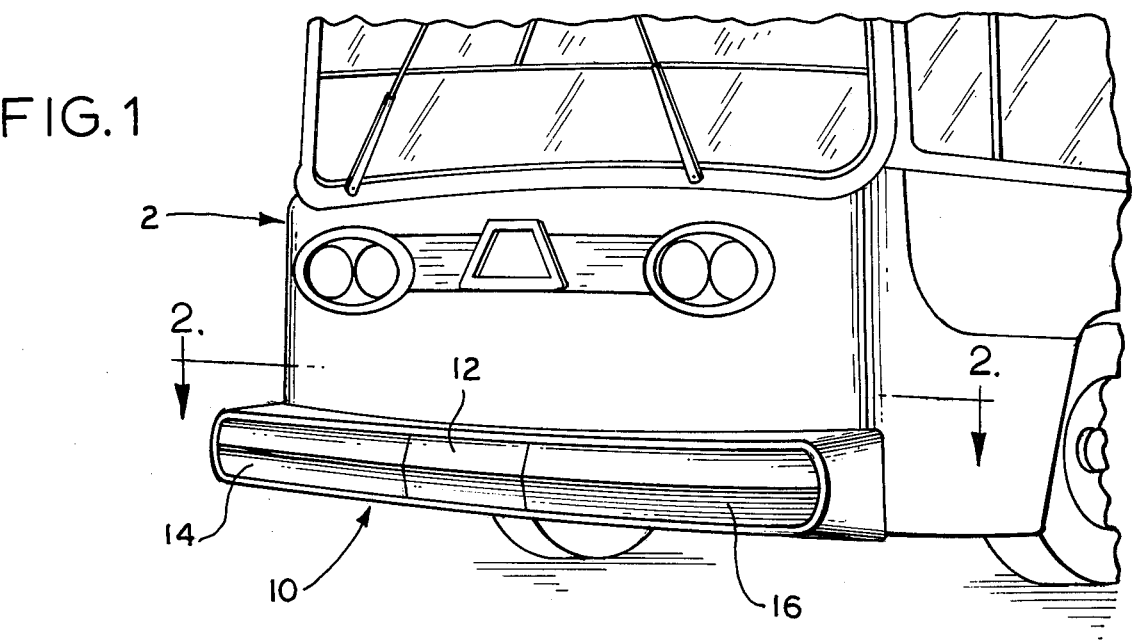
FIG. 1 is a perspective view of a bus having an energy absorbing bumper of this invention.
Figure 2:
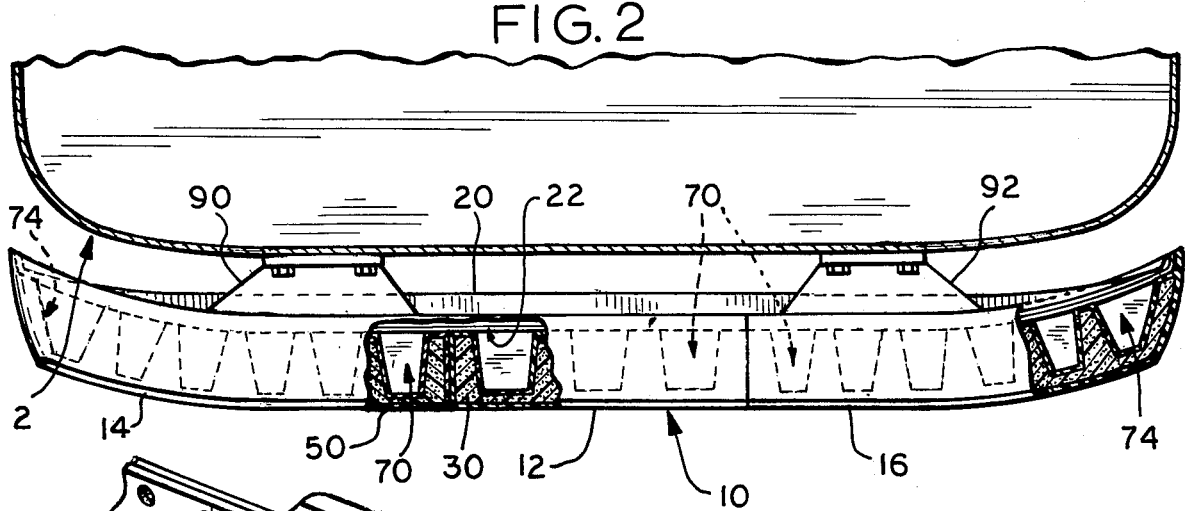
FIG. 2 is a top plan view of the energy absorbing bumper seen in FIG. 1 with portions of the bumper cut away to show the structure of the outer skin, the cellular core and the cavities.

As illustrated in FIGS. 1 and 2 of the accompanying drawings, a vehicle 2, which is illustrated as being a bus, is provided with an energy absorbing bumper 10 within the scope of this invention in its front end. In the particular embodiment illustrated (See FIG. 4), energy absorbing bumper 10 is comprised of three separate bumper sections or modules, center module 12 and end modules 14, 16. Modules 12, 14, 16 are attached to a backing plate or flex beam 20 which is attached to the appropriate part of vehicle 2 by mounting brackets 90 and 92. Of course, depending upon the size of the object or vehicle being protected and a variety of other factors, the energy absorbing guards or bumpers of this invention may consist of only a single module or many more than three.

The individual bumper modules are comprised of a cellular core 30 which is encased by a resilient outer skin 50. The bumpers and modules of the present invention have relatively large spaced apart depressions or cavities (70 in FIGS. 2 and 4) which extend from the rear transverse side of the modules, the side opposite the front contacting surface, at least partially through enclosed cellular core 30. This creates a unique compressible structure having collapsible columns encased by a resilient skin which are separated by the spaced apart cavities. Preferably, cavities 70 extend substantially, but not completely, through core 30 so that a front wall portion 32 is formed behind front contacting surface 52. These spaced apart cavities 70 are preferably located along the entire rear transverse side of the modules.

The cellular core is compressible so that it can absorb the energy imparted to the module by an impacting body. Advantageously, the cellular core has a flexible, open celled structure so that air captured within the individual cells can move through the encased core during compression. This open celled structure assists in the overall dissipation of the energy of the impacting body. On the other hand, a closed cell structure would act more like a very bouncy linear spring and would not tend to dissipate the energy since the air or blowing agent could not move through the encased core. The cellular core is preferably made from a flexible open celled thermoplastic foam and is most preferably a flexible open celled polyurethane or the like.

The outer skin is comprised of a resilient material. The resilient material is selected so that it will still tend to return to its original configuration after a severe compression. Among the resilient materials useful in the bumpers and modules of this invention are relatively stiff rubbers and plastics such as polyvinyl chloride, polyurethane, and the like. Preferably, the outer skin has a non-cellular or non-foamed structure. Preferably, the outer skin is a thermoplastic such as polyvinyl chloride or the like.

Figure 5:
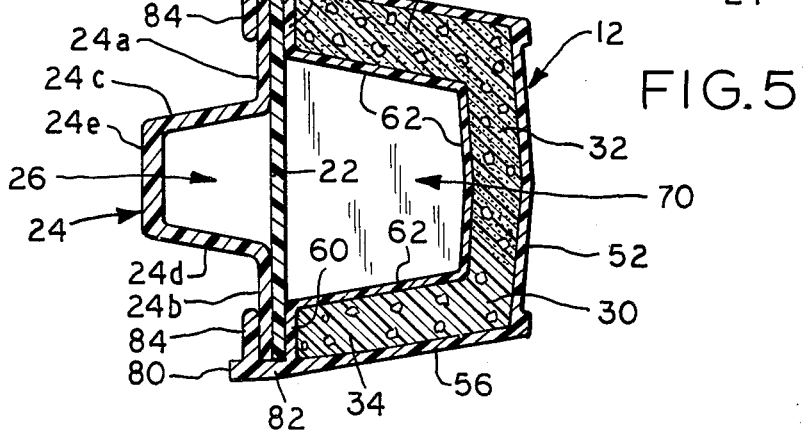
FIG. 5 is a sectional view of the center bumper module and the backing plate taken along line 5—5 in FIG. 3.
Figure 6:
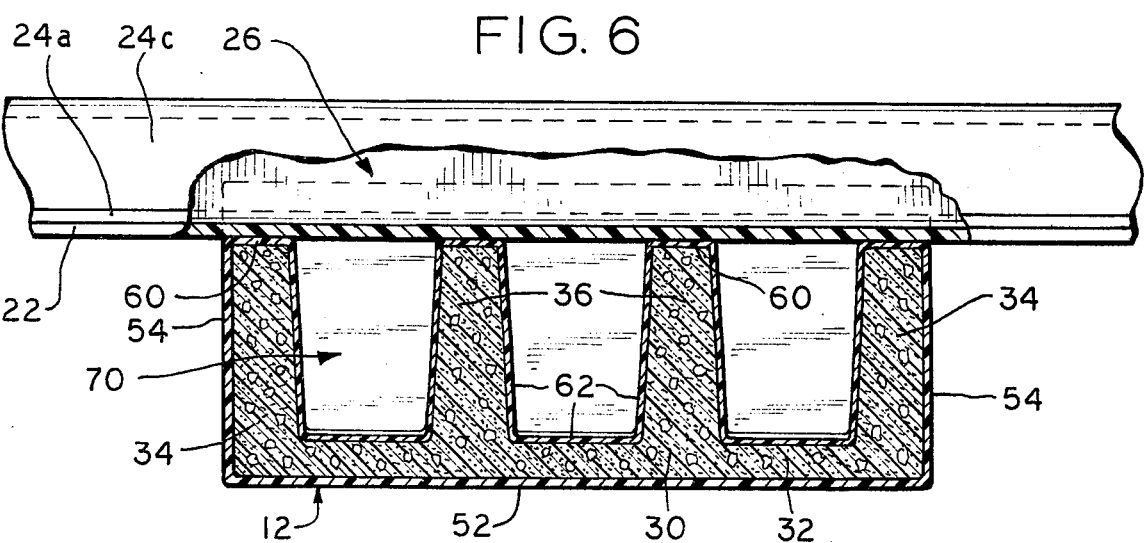
FIG. 6 is another sectional view of the center bumper module taken along line 6—6 in FIG. 3.

The structural arrangement of a preferred embodiment of core 30, outer skin 50, and cavities 70 is best illustrated in FIGS. 5 and 6 which show two sectional views of center module 12. The compressible foamed core 30 consists of a front wall portion 32, outside walls or columns 34 and inside columns 36. Front wall portion 32 is a continuous body of foam located immediately behind front outer skin 52, the point of normal first contact with any impacting body. Outside columns 34 and inside columns 36, which are contiguous with the front wall 32, are created by the existence of cavities 70 which extend into core 30 from the back side of the module.

The outer skin consists of a front portion 52, which is usually the point of initial impact with an impacting body, side portions 54, top and bottom portions 56, back portions 60, cavity wall portions 62, and integral connecting flanges 80 which will be discussed in some detail later. Advantageously, resilient outer skin 50 completely encases or encloses core 30. However, it is within the scope of this invention to provide holes or openings in the outer skin in order to permit the gases within the core to escape during a collision. Such holes would preferably be located along back portions 60 or column portions 62. In the preferred embodiment shown in FIGS. 5 and 6, the outer skin has approximately the same thickness along all of its outside portions, front portion 52, side portions 54, top and bottom portions 56 and back portions 60. Advantageously, the outer skin is thinner along column portions 62 which cover the columns and walls created by cavities 70.

The shape of cavities or voids 70 is not critical. As illustrated, they are defined by a series of essentially flat walls and have a tapered appearance. They may be formed in a variety of shapes and, for example, may be generally cylindrical, conical, or the like. Furthermore, it is not essential that the cavities all be of the same size. In the embodiment illustrated, the outermost cavities 74 in end modules 14, 16 are larger than the remaining cavities in the modules. Those cavities are also not the same size as the cavities in center module 12.

The backing plate or flex beam to which the energy absorbing bumper modules of this invention are attached should be relatively stiff or rigid. One type of backing plate suitable for use in this invention is described in U.S. Pat. No. 3,588,158 issued June 28, 1971 to Duane B. Ford et al. However, a more preferred backing plate is illustrated in the drawings, particular in FIGS. 3 through 5. This backing plate 20 is advantageously a polyester resin fiberglass composite and, preferably, the fiberglass is laminated in a unidirectional manner. Backing plate 20 is comprised of two sections, a front section 22 which is an essentially vertical plate and a back section 24 which comprises generally vertical portions 24 a and 24 b, tapered portions 24 c and 24 d, and portion 24 e, which connect portions 24 c and 24 d. Portions 24 a and 24 b are bonded to front section 22 by polyester resin or a fiberglass-resin adhesive. Portions 24 c, 24 d, 24 e and the central portion of front section 22 define a cavity 26 which extends almost the entire transverse length of the backing plate 20. The cross section of backing plate is designed to provide structural stiffness and a large modulus advantage. It will flex under fairly severe collision conditions. As shown in FIG. 4, backing plate 20 advantageously has a slight transverse concave curvature so that it partially wraps around the vehicle it protects. FIG. 4 also shows that cavity 26 is enclosed at each end of backing plate 20 by curved end portions 28 of front section 22 which mate with curved end portions 25 of back section 24.

Advantageously, backing plate 20 extends along the entire length of bumper modules 12, 14, 16 which are attached to it. Backing plate 20 is preferably designed so that all cavities 70 located along the back side of modules 12, 14, 16 are enclosed by backing plate 20.

Figure 3:
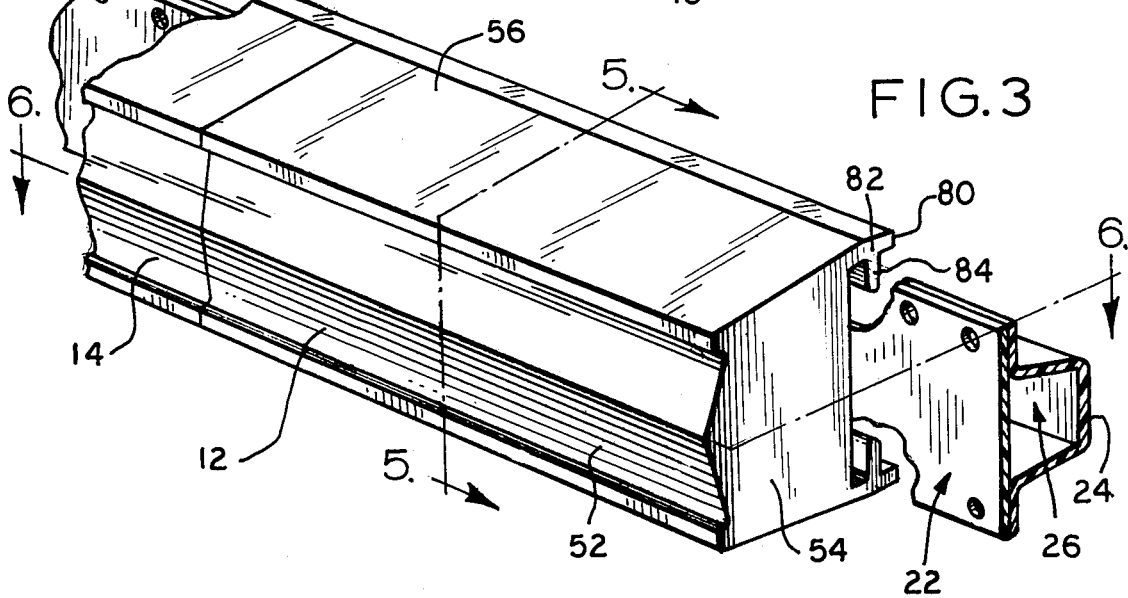
FIG. 3 is a perspective view of the center bumper module and the backing plate showing the cross-sectional structure of the backing plate and the relationship between the module and the backing plate.
Figure 4:
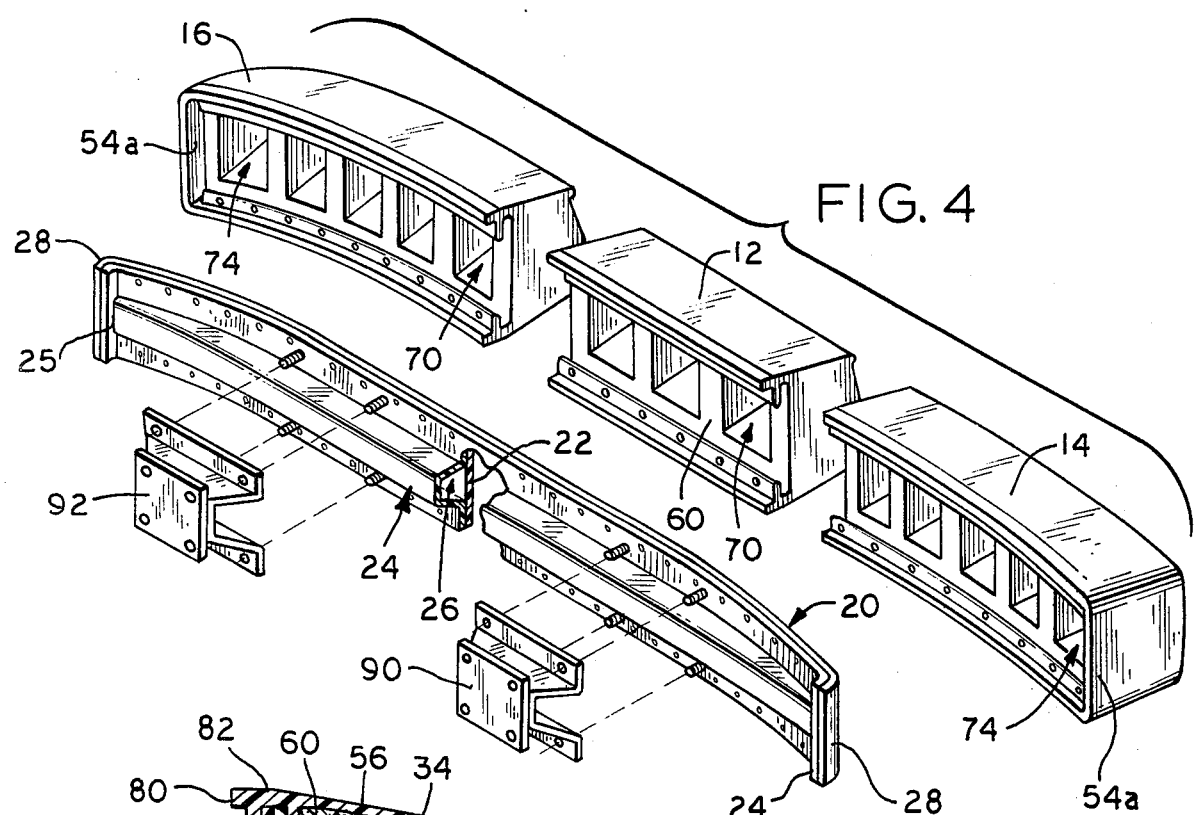
FIG. 4 is a rear exploded perspective view of the bumper modules, the backing plate and the mounting brackets used to secure the backing plate to the vehicle.

As illustrated in FIGS. 3 and 5, the bumper modules 12, 14, 16 may be mounted on backing plate 20 by means of connecting flanges 80 which project from the outer skin 50 where top and bottom portions 56 meet back portions 60. Preferably, these flanges 80 are contiguous with outer skin 50 and are made from the same resilient material as the outer skin so that they can be stretched over the upper and lower portions of backing plate 20 to simplify their attachment to it. Connecting flanges 80 are formed by generally horizontal flange portions 82 extending from the top and bottom edges at the back side of the module and by inward flange portions 84 which overlap the top and bottom portions of backing plate 20. In the preferred embodiment illustrated, inward flange portions 84 are spaced from back surface 60 of the module just far enough to permit the top and bottom portions of backing plate 20 to fit snuggly between inward flange portions 84 and the back outer skin surface 60. Most preferably, an extension 54 a extends from side portions 54 of the outer skin to overlap curved end portions 28 of backing plate 20.

An advantage of the above described integral mounting flange is that a partial seal can readily be formed between backing plate 20 and modules 12, 14, 16. This resists the outward and inward flow of air from cavities 70 during a collision. This arrangement offers additional assistance in dissipating the forces of a severe collision.

Preferably, inward flange portions 84 of modules 12, 14, 16 are secured to backing plate 20 so that a better seal may be formed between backing plate 20 and back side surface 60. This can be accomplished by a number of means, but is preferably accomplished by securing inward flange portions 84 to backing plate 20 by bolts or pop rivets which are affixed through holes drilled in inward flange portions 84 and in backing plate 20.

As illustrated in FIGS. 2 and 4, backing plate 20 is advantageously attached to vehicle 2 by means of mounting brackets 90 and 92 which can be secured to both the vehicle and the backing plate by a series of nuts and bolts.

In a specific embodiment of an energy absorbing bumper of this invention, the overall thickness of modules 12, 14, 16, excluding connecting flanges 80, is about 6½ in. The height of the modules is approximately 10 in. The thickness of outer skin 50 is approximately the same along the front 52, top and bottom 56, side 54 and back portions 60 and is about ⅛ in. The thickness of outer skin 50 along portions 62 which cover the foam surfaces defining cavities 70 is approximately 1/16 in. The thickness of front core wall 32 behind front outer skin 52 is between 2 in. and 2¼ in.

Cavities 70 in center module 12 are approximately 5 in. high and 3 in. wide at their smallest cross-section which is immediately behind front core wall 32. The cavities are approximately 4½ in. deep. The cavities 70 taper outwardly toward the back end of module 12 so that they are approximately 7 in. high and 4 in. wide at the back of the modules. The minimum thickness of foam between cavities 70 in inner columns 36 is approximately 2 in. and the minimum thickness of foam in outside walls 34 is approximately 1¼ in.

In the end modules 14, 16, cavities are generally somewhat smaller than in center module 12 except for the outermost cavity 74 at each end which are larger. The minimum thickness of foam between the cavities in end modules 14, 16 is approximately 1¼ in.

Connecting flanges 80 are approximately ⅜ in. thick. Horizontal flange portion 82 is approximately 1½ in. long and inward flange portion 84 is approximately 1¼ in. long. The gap between inward flange portion 84 and back surface 60 of the modules is approximately ¼ in., which is the approximate thickness of the top and bottom portions of backing plate 20.

The theory behind the compressible column-cavity-outer skin design of this invention is generally as follows. In a collision, the purpose of the energy absorbing bumper is to decelerate the impacting body, dissipate the kinetic energy imparted to the bumper by the impacting body, and minimize the rebound effect. It is also desirable that, during the initial stages of impact, the bumper resist the compressive stroke in a measured way, but that, in the last part of the compressive stroke, unused increased resistance be available without exceeding the maximum desirable G forces.

An entirely foamed bumper module or a bumper module having a foamed core encased in an outer skin tends to react very much like a linear spring. It tends to deflect and store the kinetic energy which is imparted to it by the impacting body, rather than dissipate it. This stored energy is then returned almost immediately to the impacting body and an unacceptable rebound effect is created.

The invention disclosed herein, which includes a plurality of relatively large cavities in the bumper modules, provides a number of advantages over a simple foam core enclosed by an outer skin. A number of these advantages of this invention are provided by the foamed columns themselves.

One of the advantages is that the linear spring reaction of a typical foamed core is diminished by reducing the cross-sectional area of the core that is first subject to compression during contact by an impacting body. This occurs because the first portion of the core that compresses, and also collapses, is the series of foamed columns separated by the cavities.

Another advantage of the present design which is directly related to the existence of the series of cavities and foamed columns is that the bumper tends to have a built-in "threshold" before any significant movement or compressive stroke takes place. This is important because, as the velocity and available kinetic energy of an impacting body rise in magnitude, there is more need for energy dissipation. But, if a significant part of the overall compression distance or stroke has been used up before it is really needed, there is less deceleration distance available over which to impart the overall resisting force available in the crash attenuating bumper. The foamed columns, separated by the cavities, tend to create a threshold due to the built-in rigidity, stiffness and resistance created by the columned core-skin configuration. With this design, it is only after a significant resistance has been overcome, at the point of column collapse or buckling, that the overall compressive stroke available begins to be significantly used.

The enclosure of the cavities by the backing plate tends to provide an additional form of resistance to the impact forces which is further enhanced if a partial seal is created between the module and the backing plate.

The air within the cavities can only escape by forcing its way between the outer skin surface of the module and the surface of the flex beam. Thus, the energy transmitted by the colliding body is resisted first by compressing the air and then by forcing it between the surfaces. A second advantage of this arrangement tends to slow and reduce the rebound of the module by creating a post crash vacuum within the enclosed cavities. That is, a vacuum is created as a result of the air that has been forced out of the cavities. When the impacting body is removed, the air can re-enter the cavities only at a much slower rate than if the cavities were entirely opened to the atmosphere. This tends to hold the front, contacting surface of the modules in their post crash position for a longer period of time. Since the seal between the modules and the backing plate is not perfect, atmospheric pressures will slowly find its way back into the cavities and permit the return of the module to its original pre-impact position through the inherent memory of the material used in its construction.

Encasing a foam in an outer skin tends to spread the force imparted by an impacting body over a greater number of cells in the foam material. This means that a fairly soft foam will react more stiffly than if it were not encased in an outer skin. Thus, a further advantage of this invention, which is due to the enclosure of the columned core with the outer skin, is that the outer skin ties the foam together in an integral structure and increases the composite stiffness over what would be present with the foam alone.

Another aspect of a preferred embodiment of the invention, which is not directly related to the presence of the cavities, is that the normal contacting surface of the modules, the front face of the outer skin, is backed by a substantial thickness of foam, the core front wall, which extends across the front surface of the module. This thickness of foam immediately behind the contacting surface helps to maintain the overall shape of the module and to give it a firm, dependable configuration. Another advantage of this aspect of the invention is that, at the end of the compression stroke created by an impacting body, it offers a large amount of added composite resistance to help dissipate the forces imparted by the impacting body.

The overall result of the structure of this invention is that an energy absorbing bumper is provided which has improved energy absorbing capabilities. For example, in one test of an energy absorbing bumper within the scope of this invention, a bumper affixed to a rigid object withstood a 13 mile per hour impact from a two ton pick-up truck.

The embodiments described herein are intended to be exemplary of the types of energy absorbing bumpers and modules which fall within the scope of our invention. However, one skilled in the art would certainly be expected to be able to make modifications and variations of these preferred embodiments without departing from the spirit and scope of the invention as defined in the following claims.

We claim:

1. An energy dissipating bumper for a motor vehicle capable of returning to its original configuration after an impact, comprising:
    a relatively rigid support member and a bumper module disposed over the support member;
    the support member having means for attachment to the vehicle;
    the bumper module having a core of compressible, open celled, thermoplastic foam having a continuous front wall and a plurality of spaced apart columns extending rearwardly from the front wall, and a resilient, thermoplastic outer skin enclosing the core, the spaces between the rearwardly extending skin covered columns forming spaced apart, unfilled cavities open to the atmosphere along the rear side of the bumper module;
    whereby the collision rebound effect of the foamed core is diminished.

2. The bumper of claim 1, wherein the outer skin is thinner where it is interposed between the cavities and the foamed core than where it covers the other surfaces of the core.

3. The bumper of claim 1, wherein the core comprises foamed flexible polyurethane and the outer skin comprises an un-foamed polyvinyl chloride.

4. An energy dissipating bumper for a motor vehicle, comprising:
    a core of compressible, open celled, thermoplastic foam, having a continuous front wall, rearwardly extending top, bottom and side walls contiguous with the front wall and with each other, and at least one column located between the top, bottom and side walls, extending rearwardly from the front wall;
    a resilient thermoplastic outer skin enclosing the core;
    the spaces between the rearwardly extending, skin covered walls and columns forming spaced apart, unfilled cavities open to the atmosphere along the rear side of the bumper module; and a means for attaching the foamed core in its outer skin to the motor vehicle;
    whereby the bumper is capable of substantial compression upon impact, and of returning to its original configuration with a diminished foam rebound effect.

5. The bumper of claim 4, wherein a plurality of spaced apart, rearwardly extending columns are located between the top, bottom and side walls of the core.

6. An energy dissipating bus bumper module capable of substantial compression upon impact, of returning to its original configuration after an impact, and possessing a diminished collision rebound effect, comprising:
    a core of compressible, open celled, foamed, flexible polyurethane, having a continuous front wall of substantial thickness, four rearwardly extending outer walls contiguous with the front wall and with each other, and at least two spaced apart, rearwardly extending columns located between the outer walls;
    a resilient, un-foamed, polyvinyl chloride outer skin encasing the foamed core;
    the spaces between the skin covered walls and columns forming relatively large, spaced apart, unfilled cavities open to the atmosphere;
    the outer skin including a pair of integral flanges extending along the top and bottom edges of the back side of the module; and a means for supporting the bumper module on the bus.

7. The bus bumper module of claim 6, wherein the outer skin is thinner where it is interposed between the cavities and the foamed core than where it covers the other surfaces of the core.

8. The bumper module of claim 6, wherein the supporting means comprises a support member and means for affixing the support member to the bus, and wherein the integral flanges of the bumper module are disposed over the support member to support the bumper module on said member.

9. An energy dissipating bus bumper which is capable of returning to its original configuration after a collision, comprising:
    a relatively stiff, elongated backing member;
    means for attaching the backing member to the bus;
    a plurality of bumper members having a core of compressible, open celled, thermoplastic foam including a continuous front wall and a plurality of spaced apart columns extending rearwardly from the front wall, and a resilient unfoamed thermoplastic outer skin enclosing the core, the spaces between the skin covered columns forming unfilled cavities open to the atmosphere along the rear of the bumper members; and
    means for supporting the bumper members on the backing member;
    whereby the collision rebound effect of the foamed core is diminished 10. The bumper of claim 9, wherein the means for supporting the bumper members on the backing member includes a pair of flanges integral with the outer skin, comprised of the same material as the outer skin, which flanges extend along the top and bottom edges of the rear of the bumper members for overlapping the respective top and bottom portions of the backing plate.

11. The bumper of claim 9, wherein the backing member covers the cavities at the rear of the bumper members and the means for supporting the bumper members on the backing member creates a partial seal between the backing member and the bumper members to restrict the flow of air out of the cavities during a collision.

* * * * *